(12) United States Patent
Tunis, III et al.

(10) Patent No.: US 6,773,655 B1
(45) Date of Patent: *Aug. 10, 2004

(54) LARGE COMPOSITE STRUCTURES AND A METHOD FOR PRODUCTION OF LARGE COMPOSITE STRUCTURES INCORPORATING A RESIN DISTRIBUTION NETWORK

(75) Inventors: George C. Tunis, III, Wilmington, DE (US); William H. Seemann, III, Pass Christian, MS (US)

(73) Assignee: TPI Technology, Inc., Warren, RI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1156 days.

(21) Appl. No.: 08/612,251

(22) Filed: Mar. 7, 1996

Related U.S. Application Data (63) Continuation-in-part of application No. 08/475,849, filed on Jun. 7, 1995, now Pat. No. 5,958,325.

(51) Int. Cl.$^7$ ............................................. B29C 70/44
(52) U.S. Cl. ....................... 264/510; 264/511; 264/571; 264/257; 264/258; 264/324; 425/389; 425/390
(58) Field of Search ................................ 264/510, 511, 264/512, 571, 257, 258, 324; 425/389, 390

(56) References Cited

U.S. PATENT DOCUMENTS

| | | | |
|---|---|---|---|
| 2,913,036 A | 11/1959 | Smith | 154/1.6 |
| 3,146,148 A | 8/1964 | Mitchella et al. | 156/382 |
| 3,309,450 A | 3/1967 | Rodgers | |
| 4,125,526 A | 11/1978 | McCready | 264/90 |

(List continued on next page.)

FOREIGN PATENT DOCUMENTS

| | | |
|---|---|---|
| FR | 1504274 | 2/1968 |
| JP | 503098 | 1/1975 |
| JP | 3162933 | 7/1991 |
| NL | 9200963 | 1/1993 |

OTHER PUBLICATIONS

P. Lazarus, "Reverse, MACT", Professional BoatBuilder Magazine, Oct./Nov., 1994, No. 31, p. 3.
P. Lazarus, "Infusion!", Part One, Professional BoatBuilder Magazine, Oct./Nov., 1994, No. 31.
P. Lazarus, "Infusion", Part Two, Professional BoatBuilder Magazine, Dec./Jan., 1995, No. 32, pp. 28–34.
Film Tehcnology, Inc., advertisement for Quick Draw™ Films, High–Performance Composites 1995 Sourcebook, p. 29.
W. Sutliff "Compositties Promise Affordable Ship Structures", Centerline, May–Jun., 1991, pp. 1–4.
L.H. Walker, "Low Cost, High Quality Composite Ship Structures Technology Demonstrated", Research Release, Carderock Division, Naval Surface Warfare Center, May 1993, pp. 1–4.
SCRIMP Systems, product brochure.

Primary Examiner—Stefan Staicovici
(74) Attorney, Agent, or Firm—Eckert Seamans Cherin & Mellott, LLC (57) ABSTRACT

Large composite structures are produced using a vacuum assisted resin transfer molding process incorporating a resin distribution network. The resin distribution network is provided by a textured sheet of metal formed as an integral vacuum bag and mold. The texture is formed by upraised portions on one side of the sheet which correspond with depressions on the other side. Valleys between the upraised portions form the resin distribution network. A fiber lay up is placed against the textural sheet with the upraised portions facing the lay up. Main feeder grooves are also formed directly in the sheet. Resin is supplied under vacuum to the main feeder grooves, from where it travels through the valleys of the textured sheet to impregnate the lay up.

11 Claims, 6 Drawing Sheets

U.S. PATENT DOCUMENTS

| | | | |
|---|---|---|---|
| 4,132,755 A | 1/1979 | Johnson | 264/553 |
| 1,217,157 A | 8/1980 | Stoltze et al. | 156/87 |
| 4,238,437 A | 12/1980 | Rolston | 264/102 |
| 4,270,964 A * | 6/1981 | Flaskett | 125/228 |
| 4,312,829 A | 1/1982 | Fourcher | 264/571 |
| 4,359,437 A | 11/1982 | le Comte | 264/102 |
| 4,560,523 A | 12/1985 | Plumley et al. | 264/102 |
| 4,676,041 A | 6/1987 | Ford | 52/309.11 |
| 4,822,436 A | 4/1989 | Callis et al. | 156/211 |
| 4,902,215 A | 2/1990 | Seemann, III | 425/406 |
| 4,942,013 A * | 7/1990 | Palmer et al. | 264/511 |
| 4,975,311 A | 12/1990 | Lindgren | 428/156 |
| 5,045,251 A | 9/1991 | Johnson | 264/40.1 |
| 5,052,906 A | 10/1991 | Seemann | 425/112 |
| 5,087,193 A | 2/1992 | Herbert, Jr. | 425/543 |
| 5,096,651 A | 3/1992 | le Comte | 264/510 |
| 5,123,985 A | 6/1992 | Evans et al. | 156/213 |
| 5,129,813 A | 7/1992 | Shepherd | 425/504 |
| 5,304,339 A | 4/1994 | Le Comte | 264/511 |
| 5,316,462 A | 5/1994 | Seemann | 425/112 |
| 5,439,635 A | 8/1995 | Seemann | 264/510 |
| 5,593,633 A * | 1/1997 | Dull et al. | 264/510 |

* cited by examiner

LARGE COMPOSITE STRUCTURES AND A METHOD FOR PRODUCTION OF LARGE COMPOSITE STRUCTURES INCORPORATING A RESIN DISTRIBUTION NETWORK

RELATED APPLICATION

This application is a continuation-in-part of U.S. patent application Ser. No. 08/475,849, filed on Jun. 7, 1995, now U.S. Pat. No. 5,958,325, the disclosure which is incorporated herein by reference.

FIELD OF THE INVENTION

This invention relates to the production of fiber reinforced resin composite structures, and in particular to processes for vacuum assisted resin transfer molding of large composite structures.

BACKGROUND OF THE INVENTION

Vacuum assisted resin transfer molding (VA-RTM) has been used to produce a number of large, fiber reinforced composite structures such as boat hulls which incorporate materials such as foam and balsa cores. The cores are covered with a fiber reinforced resin. In the VA-RTM process, the reinforcement fiber, such as a fabric or mat, is arranged in a single sided mold in a dry condition along with the desired core materials according to the form of the desired finished part. The lay-up is then encapsulated in a vacuum bag and impregnated with resin under vacuum. The resin is allowed to cure.

Various methods have been utilized to introduce and enhance the distribution of resin through the reinforcement fiber. These methods include the placement of a disposable distribution media over the outside layer of fabric and the incorporation of holes and/or slots penetrating through the core to allow resin to flow from the outer to the inner layer of reinforcement fiber. See, for example, U.S. Pat. Nos. 5,316,462 and 4,560,523. A supply groove in a foam core has also been used in a closed mold resin injection process to facilitate resin flow. See, for example, U.S. Pat. No. 5,096,651.

SUMMARY OF THE INVENTION

The present invention relates to a method for distributing resin during the manufacture of large composite structures using a vacuum assisted resin transfer molding (VA-RTM) process and the composite structure produced by this method. The composite structure is formed from internal cores surrounded by fiber reinforced resin. In one embodiment of the invention, resin is supplied directly into a network of main feeder grooves which are interconnected to a series of smaller microgrooves formed in the surface of the internal cores. From the feeder grooves and microgrooves, the resin flows outwardly from the core to penetrate the reinforcement fiber. In a second embodiment of the invention, a separate distribution medium is interposed between the internal core and the fiber reinforcement. The resin is supplied directly to one or more main feeder grooves in the core surface and penetrates the reinforcement fiber via the distribution medium. Also, the main feeder grooves can extend around the cores to form supply loops, allowing impregnation of transverse structural members.

In a further embodiment, an integrated vacuum bag and mold are formed from a textured sheet of metal. The texture is formed by closely spaced upraised portions on one side of the sheet which correspond with depressions on the other side of the sheet. The closely spaced upraised portions define valleys therebetween which form a resin distribution network. Main feeder grooves are formed directly in the sheet. The textured sheet can also be used as a mold from which other tools are made.

With this method, large composite structures which require multiple cores can be formed quickly prior to the gel time of typical vinyl ester or polyester resins, and the amount of resin used can be minimized. By supplying the resin directly through the vacuum bag into the feeder grooves, the supply is not limited to a part edge or inlet in a tool. Adjacent cores can be supplied via a single resin inlet. The resin distribution network can remain in the finished part, eliminating disposal of distribution materials. In this case, the microgrooves are filled with resin after curing, thereby increasing interlaminar shear strength and delamination strength. Structural features such as shear ties, compression webs, or beams can be incorporated directly into the composite part during the molding process.

DESCRIPTION OF THE DRAWINGS

The invention will be more fully understood from the following detailed description taken in conjunction with the accompanying drawings in which.

DETAILED DESCRIPTION OF THE INVENTION

Figure 1:
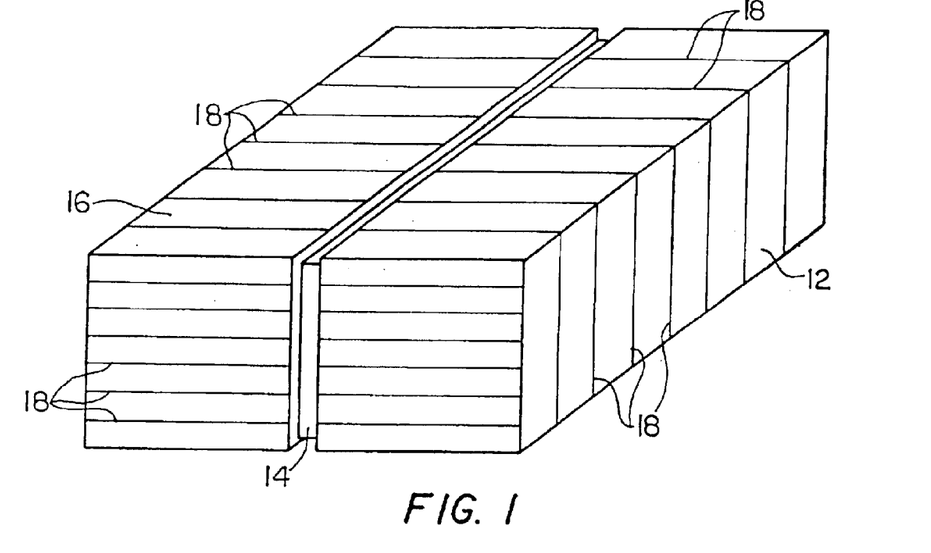
FIG. 1 is a perspective view of a core for a composite structure according to a first embodiment of the present invention.

A large composite part made according to the present invention includes a core 12, shown in FIG. 1. The core is made from a material able to support the pressure of a vacuum. Typical materials include foams, such as a polyurethane or a polyvinyl chloride, or balsa wood. The core can be solid or hollow, such as a blown polyethylene. Concrete may also be used. The core is shown as a rectangular block, although other configurations are possible, as discussed further below.

One or more main feeder grooves or channels 14 are provided in the surface 16 of the core. The main feeder groove may circumscribe the entire core to form a loop. A resin distribution network comprising channels of a smaller cross-sectional area than the main feeder groove is provided in contact with the surface of the core for fluid communication with the main feeder groove.

In a first embodiment of the present invention, the resin distribution network is provided in the form of a plurality of microgrooves 18 machined in the surface 16 of the core 12, as shown in FIG. 1. The microgrooves 18 are generally arranged transversely to the main feeder groove 14. Some of the microgrooves may circumscribe the entire core to create a resin flow loop beginning and ending at the main feeder groove. The actual relation of the microgrooves to the main feeder groove depends on the geometry of the core and the optimization of the resin impregnation, as discussed further below.

Figure 2:
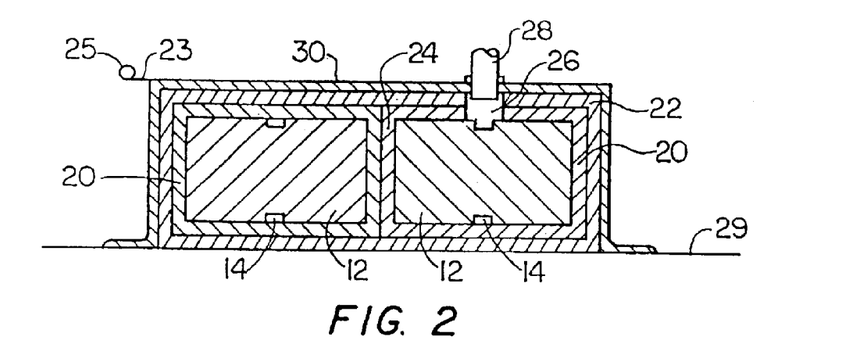
FIG. 2 is a schematic cross-sectional view of a composite structure being formed according to the first embodiment of the present invention.

The core 14 with the network of grooves is covered with one or more layers of a fiber material 20, illustrated schematically in FIG. 2. The fiber material may be a cloth or mat formed from fibers of glass, carbon, or other suitable material. Depending on the structural requirements of the desired finished part, the core may be completely surrounded with fiber material, or one or more surfaces of the core may be left free of fiber material. The fiber material may be wrapped in a sheet around the core, or individual pieces of fiber material may be applied to the desired core faces. The fiber may also be supplied in a tubular form into which the core is inserted.

A plurality of fiber wrapped cores are arranged to form the desired finished part. Although two cores are shown in FIG. 2, the actual number and arrangement of cores is determined by the desired finished part. One or more layers of a fiber material can be wrapped around a plurality of cores to form an outer skin 22, shown schematically in FIG. 2. The particular number of layers of fiber material, the type, and the arrangement depend on the desired finished part and can be readily determined by those of skill in the art. A bleeder layer is generally provided in the form of a tab 23 extending from an outer fiber layer to a vacuum outlet 25. Peel plies, typically required with prior art vacuum processes, are generally not needed with the process of the present invention.

The fiber material 24 surrounding and between the cores creates structural members such as shear ties, compression webs, and beams. For example, referring to FIG. 4, a plurality of triangular cores 40 are used to form a deck. The fiber material between adjacent triangular cores forms diagonal structural members 41 that support both compression and shear forces.

During the lay-up, suitable fittings 26, such as plastic or copper tees, are positioned in the main feeder grooves 14 to facilitate the subsequent insertion of resin supply tubes 28. One or more fittings may be positioned in each feeder groove, to accommodate the desired resin flow. The lay-up is placed against a mold 29, and a vacuum bag 30 is then placed over the lay-up, including the plastic fittings, and sealed to the mold in a manner known in the art, as shown schematically in FIG. 2. The vacuum bag is then punctured and the supply tubes 28 are inserted through the vacuum bag directly into their respective fittings 26. The supply tubes are sealed to the bag to retain vacuum integrity. In this manner, the main feeder grooves are supplied directly with resin by penetrating the outer vacuum bag with a supply tube that is inserted directly into the groove.

Figure 8:
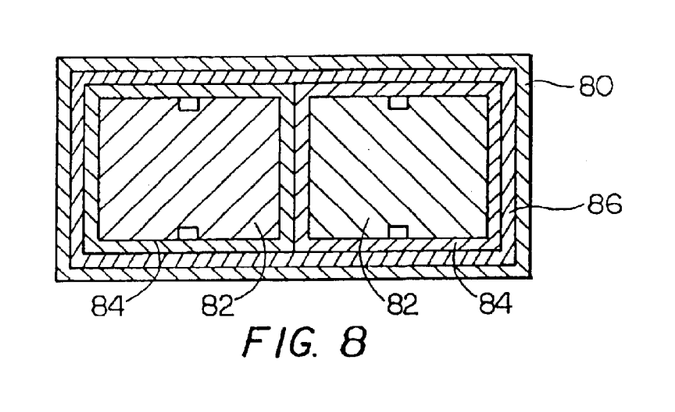
FIG. 8 is a schematic cross-sectional view of a composite structure being formed using an integrated mold and vacuum structure.

Referring to FIG. 8, the vacuum bag and mold may also be integrated into a single structure 80 which is rigid enough to retain its shape as a mold but flexible enough to collapse against the part upon application of a vacuum. For example, the integrated structure 80 may comprise a thin gauge steel sheet, such as 0.25 inch or thinner. The cores 82 and fiber material 84, 86, as described above, are encapsulated in the steel sheet. Holes are drilled through the sheet to access the fittings. Resin impregnation occurs as described above. The integrated structure may be formed of other suitable materials, such as rubber or silicone or a thin composite sheet material such as a plastic laminated metal.

Figure 9:
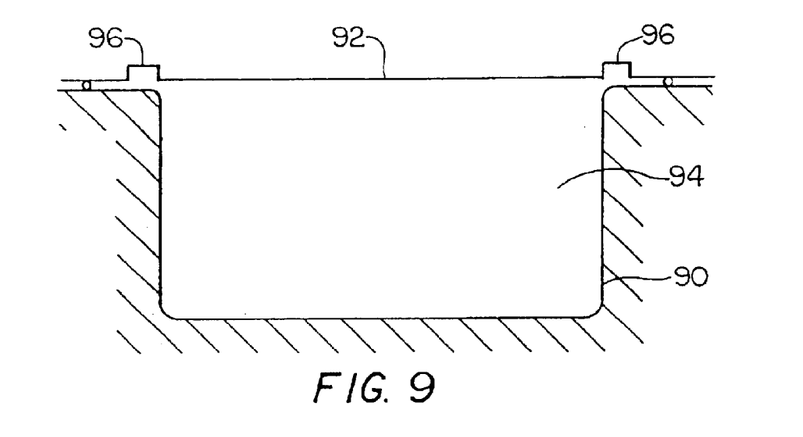
FIG. 9 is a schematic cross-sectional view of a rigid mold and flexible lid for forming a composite structure.

FIG. 9 illustrates a further mold embodiment in which a rigid mold 90 is sealed with a flexible lid 92 formed, for example, from a steel or plastic material. A part, comprising the cores and fiber material as described above, is placed in the recess 94 defined by the rigid mold. A vacuum groove 96 in the lid surrounds the part. Holes are provided through the lid or mold to access fittings for resin impregnation as described above. During impregnation of the resin under vacuum, the lid flexes at the edge of the vacuum groove, to allow compaction of the part.

Figure 3:
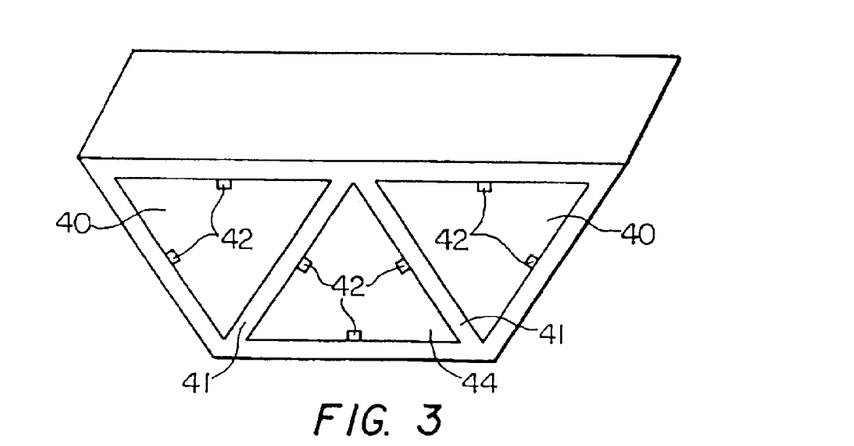
FIG. 3 is a schematic perspective view of a further composite structure being formed according to the present invention.
Figure 4:
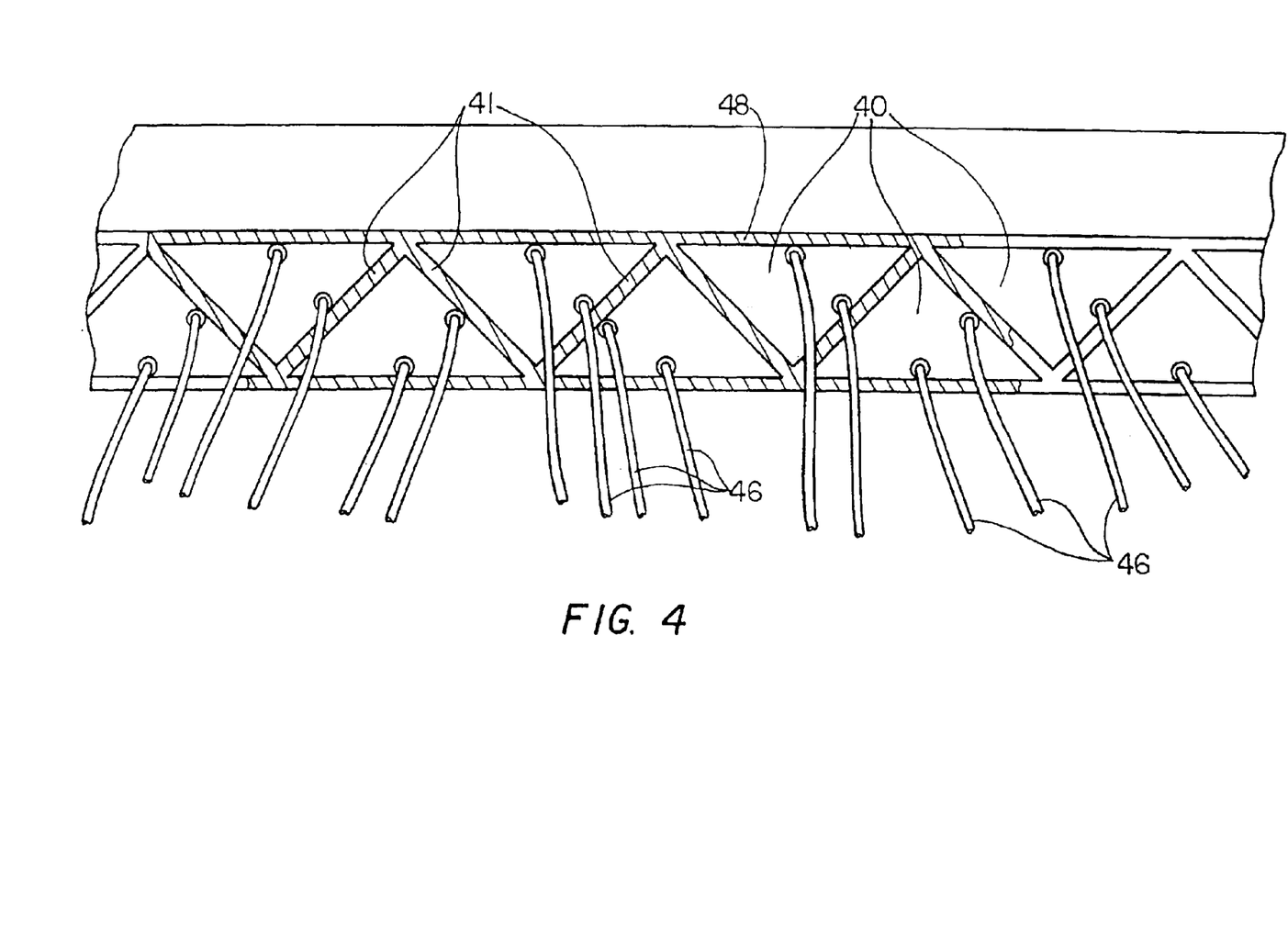
FIG. 4 is a perspective view of a composite structure being formed according to the present invention.

The resin, such as a polyester, vinyl ester, epoxy, phenolic, acrylic, or bismaleimide, travels relatively quickly through the main feeder grooves 14 and into the microgrooves 18. From the microgrooves, the resin penetrates the fiber material 20, 22. Impregnation results from resin infusion originating at the core surface 16 and migrating outwardly to the exterior of the part. The fiber material on adjacent core surfaces may be impregnated via a main feeder groove in one of the adjacent cores, as indicated in FIGS. 3 and 4.

Figure 10:
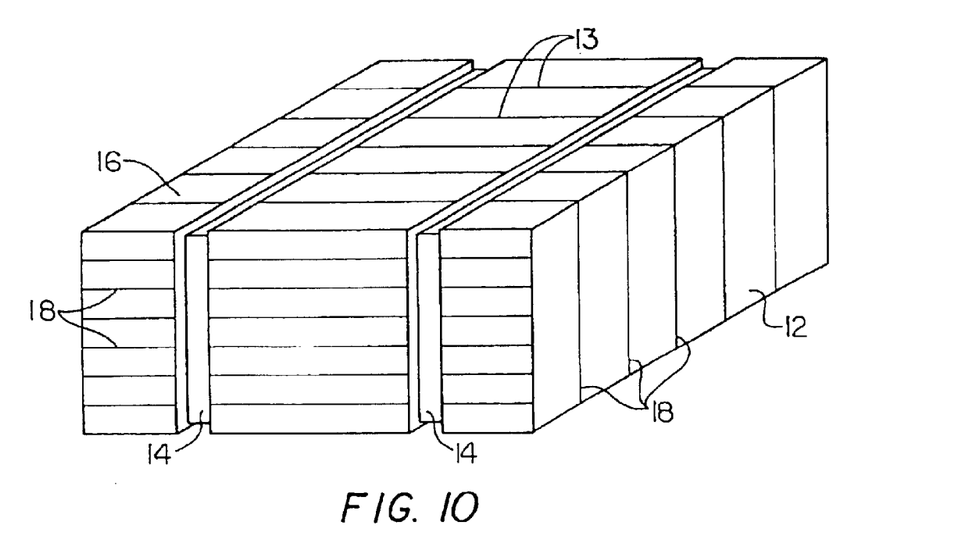
FIG. 10 is a perspective view of a core for a composite structure having multiple main feeder grooves.

The cross-sectional area of the main feeder groove and the cross-sectional area and spacing of the microgrooves are optimized to provide a suitable time to allow the resin to impregnate all of the fiber material before curing without leaving unimpregnated areas. A typical main feeder groove may have a depth of 0.5 inch and a width of 0.5 inch for a cross-sectional area of 0.25 square inches. Typical microgrooves may have a depth of 0.125 inch and a width of 0.125 inch for a cross-sectional area of approximately 0.016 square inches. The microgrooves may be spaced 1.0 inch on center. These dimensions may be modified to accommodate reinforcement fiber materials of different types and/or thicknesses. Also, the cross-sectional area of the main feeder grooves may be increased if the part is particularly large to more rapidly distribute the resin to all sections of the part. Similarly, multiple main feeder grooves 14 may be provided in a core 12, as indicated in FIG. 10.

In addition, the cross-sectional area of the main feeder grooves or the microgrooves may be reduced to create flow restrictions to increase resin dwell time at a particular area. Resin dwell time may also be increased by placing a resin "fuse" in the feeder groove which temporarily blocks the resin flow. The fuse dissolves after contact with the resin after a known period of time, which may be set by the length of the fuse. For example, with a vinyl ester resin, a styrofoam fuse has been used successfully. The feeder grooves may also terminate to redirect resin flow.

The main feeder grooves 14 allow passage of resin from one core to an adjacent core. Holes may be provided through the cores to connect main feeder grooves. Each main feeder groove may be supplied with resin simultaneously, creating parallel circuits, or in a prescribed sequence, creating series circuits, depending on the geometry and size of the part to be impregnated. Additionally, the main feeder grooves may be independent of each other, creating separate circuits.

After impregnation, the resin is allowed sufficient time to cure. Once cured, the microgrooves 18 are filled with solid resin. This resin provides a lateral locking mechanism which improves the interlaminar shear strength of the bond between the fiber reinforced composite and the core. The resin remaining in the groove network also increases the forces necessary to delaminate the fiber reinforced face skins from the core.

The actual arrangement and shape and number of cores depends on the desired finished part. For example, triangular cores 40 are shown in FIG. 3. The triangular cores may have main feeder grooves 42 provided in at least two surfaces. A central triangular core 44 may have main feeder grooves in three surfaces. Microgrooves are provided in the surfaces as described above. A plurality of triangular cores may be arranged in, for example, a row to form a deck. In this example, resin, supplied through tubes 46, is impregnated sequentially beginning at the central core and progressing toward the edges, as shown by the shaded region 48 in FIG. 4.

Figure 5:
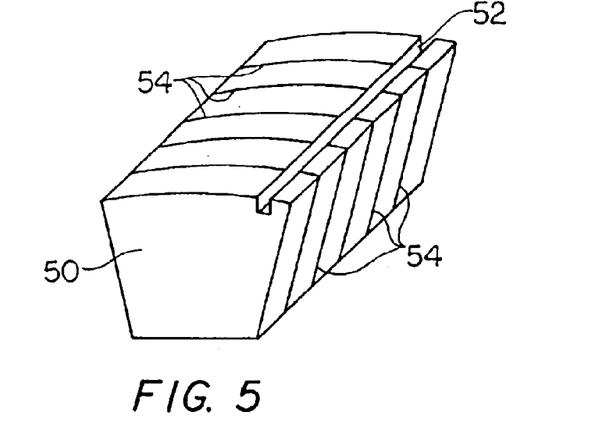
FIG. 5 is a perspective view of a further core for a composite structure according to the present invention.

An arcuate core 50 is shown in FIG. 5. The arcuate core 50 may have a main feeder groove 52 in one surface and a network of microgrooves 54 radiating from the feeder groove to circumscribe the core. The arcuate cores may be used to form curved structures such as boat hulls or arches.

Figure 6:
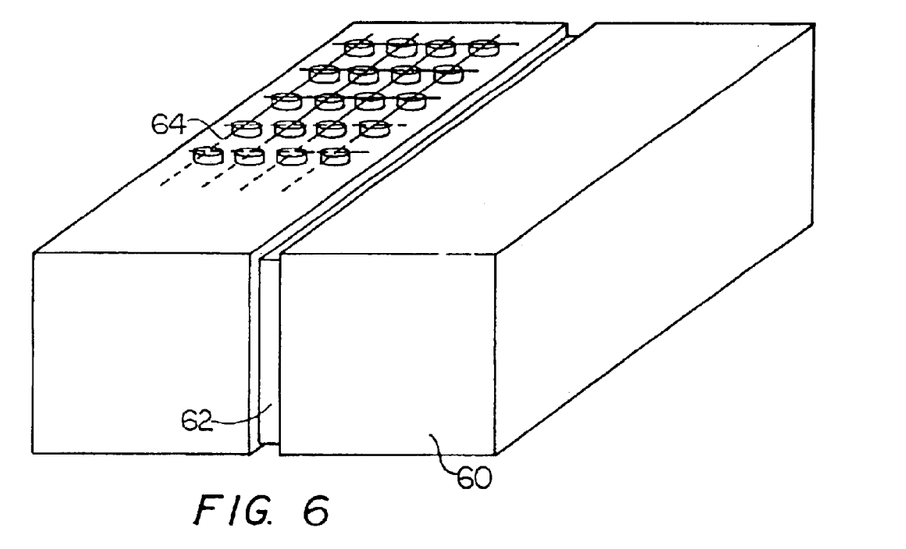
FIG. 6 is a perspective view of a core for a composite structure according to a second embodiment of the present invention.
Figure 7:
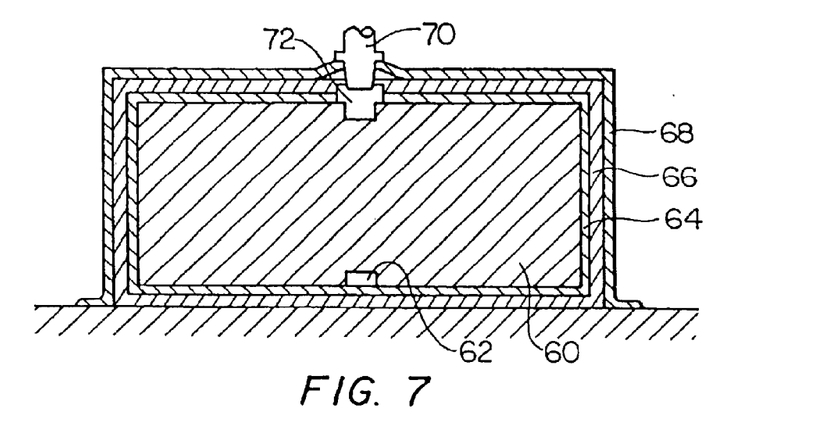
FIG. 7 is a schematic cross-sectional view of a composite structure being formed according to the second embodiment of the present invention.

In another embodiment of the present invention, illustrated in FIGS. 6 and 7, a core 60 is provided with a main feeder groove 62 as described above. A distribution medium 64 is then provided adjacent the core faces. The medium comprises a network of open passageways formed by a structure capable of maintaining the passageways in an open condition during application of the vacuum. For example, the medium may comprise intersecting filaments held in spaced relation from the core surface by post-like members located at each filament intersection, a grid-like structure of aligned strips, or an open weave fabric. Suitable distribution media are known for example, from U.S. Pat. Nos. 4,902,215 and 5,052,906, incorporated herein by reference. A fiber material 66 is then wrapped over the distribution media, as described above. A plurality of cores are arranged to form the desired finished part, and a vacuum bag 68 is placed over the cores and fiber material, as described above. Resin supply tubes 70 leading from a resin source are inserted through the bag 68 and fiber material 66 to fittings 72 in the main feeder grooves 62. The supply tubes 70 are sealed to the vacuum bag in a manner known in the art. Resin is fed through the supply tubes to the main feeder grooves. The resin travels relatively quickly through the main feeder grooves and into the distribution media. From the distribution media, the resin penetrates the fiber material. A suitable time interval is provided to allow the resin to cure.

Resin distribution media presents a more uniform resin flow front than the microgrooves. For this reason, resin distribution media are generally preferred for more complicated parts, whereas microgrooves are preferred to conserve resin, since less resin flows through the microgrooves.

Figure 11:
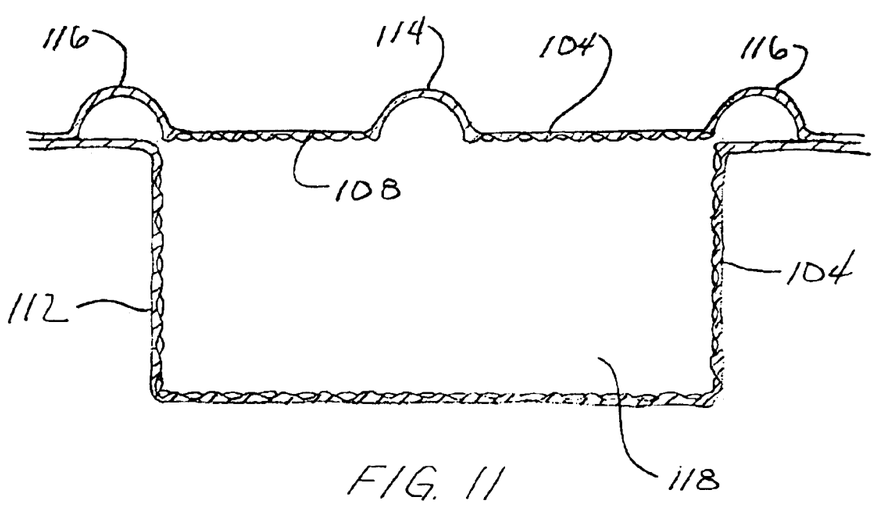
FIG. 11 is a schematic cross-sectional view of an integrated mold and vacuum bag for forming a composite structure according to a further embodiment of the present invention.
Figure 12:
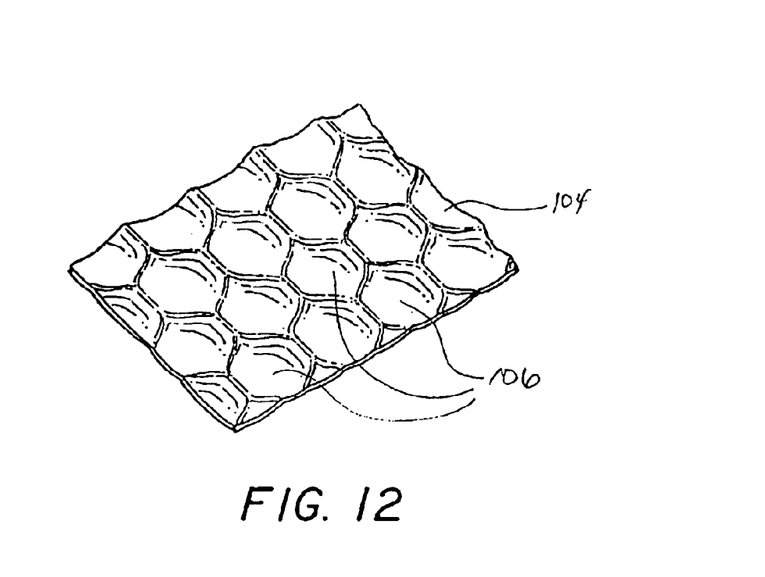
FIG. 12 is a perspective view of one side of a textured sheet of material forming the integrated mold and vacuum bag of FIG. 11.
Figure 13:
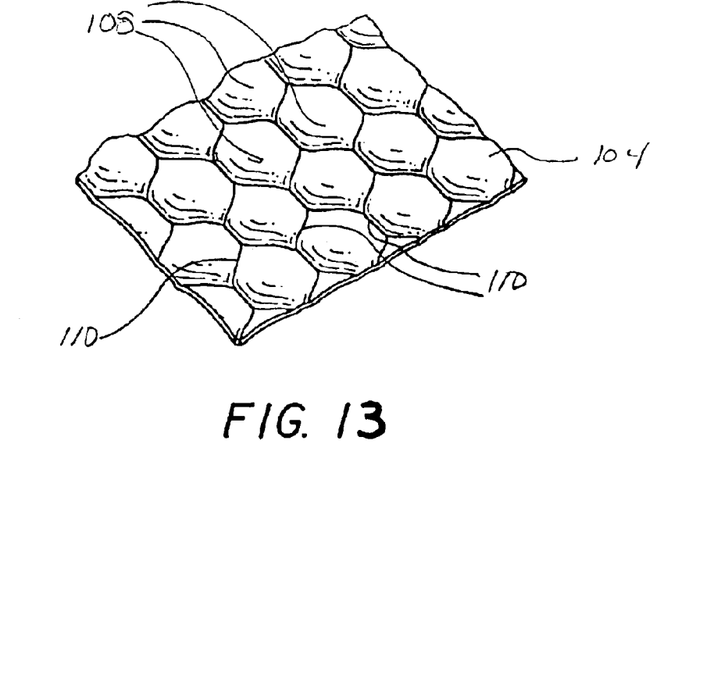
FIG. 13 is a perspective view of the other side of the textured sheet of FIG. 12.

In a further embodiment, illustrated in FIGS. 11 through 13, the vacuum bag and mold are integrated into a single tool 102 formed from a textured sheet 104 of metal, such as a thin gauge steel sheet. The sheet is rigid enough to retain its shape as a mold, but flexible enough to collapse or be pulled against the part under the vacuum applied during a resin impregnation process, discussed further below. A sheet thickness of 0.25 inch or less has been found suitable. A plastic or a composite material such as a metal and plastic laminate formed as a textured sheet may also be used.

Preferably, the texture is formed by closely spaced upraised portions 108 formed on one side of the sheet 104 which correspond to depressions 106 on the other side of the sheet. The closely spaced upraised portions 108 define valleys 110 therebetween which form a resin distribution network. For example, the upraised portions may have a generally hexagonal shape having a longest dimension of between ⅜ inch and ⁷⁄₁₆ inch. A depth of the valleys of approximately 30 thousandths of an inch has been found to be suitable. Such a textured sheet is readily formable and is commercially available from Ardmore Textured Metal of Edison, New Jersey. Alternatively, the texture could be provided on a single side of the sheet if desired, such that the upraised portions do not make corresponding depressions on the other side.

The sheet is shaped into the desired form of a mold 112 having a mold cavity 118 with the upraised portions of the sheet forming the interior walls of the cavity, thereby facing the part to be impregnated. Main feeder grooves 114 are formed directly in the sheet 104 in the desired locations, rather than in the cores as described above. The main feeder grooves may have dimensions as discussed above. Vacuum outlet channels 116 are formed around the perimeter of the tool.

To form a composite part, a fiber lay up is placed within the cavity 118 adjacent the textured surfaces of the tool, and the tool is sealed as with a tacky tape or other seal as is known in the art. A peel ply may be used if the texture is not to be retained on the part. Alternatively, a peel ply may be omitted if the texture is desired to be retained on the surface of the part. Forming the texture on the part imparts some further stiffness to the part and may be desired for esthetic reasons as well. The fiber lay up may comprise cores wrapped with fiber material as discussed above. Fittings are inserted into the main feeder grooves through punctures made in the sheet as discussed above. A vacuum is applied to the interior of the tool, and the sheet of textured material is pulled adjacent the fiber lay up such that the tops of the upraised portion contact the fiber lay up, but the valleys remain open to form a network of narrow, interconnected passageways through which resin is able to flow. Under the vacuum, resin is drawn first into the main feeder grooves and then into the valleys. From the valleys, the resin is able to fully impregnate the fiber material, flowing finally to the vacuum outlet channels around the perimeter. The resin is allowed sufficient time to cure. After curing, the part is removed from the tool.

In an alternative embodiment, the textured sheet can be used as a lid in conjunction with a conventional mold. The fiber lay up is placed against the mold surface. The textured sheet is placed over the fiber lay up and sealed to the mold in any suitable manner. Additional resin distribution media may need to be used adjacent the conventional mold surfaces. Resin impregnation occurs as discussed above.

The textured sheet can also be used as a master mold which is used to make tools from other materials, such as ceramics. The tool is then used as a mold in the resin impregnation process. In this case, the sheet comprises a negative of the tool; that is, the side of the sheet having the indentations is used to form the tool. The resulting tool has the configuration of the upraised portions separated by the valleys, which form a resin distribution medium as discussed above. A ceramic mold generally does not flex to collapse against the part under vacuum. In this case, a separate vacuum bag is used in conjunction with the mold, as is known in the art.

The invention is not to be limited by what has been particularly shown and described, except as indicated by the appended claims.

We claim:

1. A method of forming a composite structure comprising:
    providing a tool for forming a composite structure by vacuum assisted resin transfer molding, said tool comprising:
        a mold surface and a vacuum bag arranged with said mold surface to form a mold cavity for receiving a part to be impregnated with resin;
        at least a portion of said vacuum bag being formed from a self-supporting sheet material having a texture formed by upraised portions on a first side of said sheet material, said upraised portions being closely spaced valleys defined between the upraised portions, said valleys forming a resin distribution network, said self-supporting sheet material having a predetermined shaped contour in addition to said texture, said sheet material rigid enough to retain the predetermined shaped contour as a mold in addition to retaining the resin distribution network, but flexible enough to collapse as a sheet against the part under a vacuum applied during the vacuum assisted resin transfer molding; and
        a main feeder channel having a cross-sectional area larger than a cross-sectional area of said valleys being provided in fluid communication with said valleys and extending along a portion of said tool to provide resin to said resin distribution network;
    providing the part to be molded in said mold cavity;
    sealing said mold cavity;
    connecting a source of uncured resin to said main feeder channel;
    connecting said mold cavity to a vacuum outlet;
    moving said uncured resin through said main feeder channel and said resin distribution network to said vacuum outlet to fill said part in said mold cavity to impregnate said part; and
    curing said uncured resin to form a composite structure.

2. The method of claim 1, wherein, in said tool providing step, said vacuum bag and said mold are unitary.

3. The method of claim 1, wherein, in said tool providing step, said portion of said vacuum bag forms said mold surface, whereby said vacuum bag and said mold are unitary.

4. The method of claim 1, wherein, in said tool providing step, said valleys have a depth of approximately 30 thousandths of an inch.

5. The method of claim 1, wherein, in said tool providing step, said upraised portions are generally hexagonal in shape and have a longest dimension between ⅜ inch and 7/16 inch.

6. A method of forming a composite structure comprising:
    providing a tool for forming a composite structure by vacuum assisted resin transfer molding said tool comprising:
        a mold surface and a vacuum bag arranged with said mold surface to form a mold cavity for receiving a part to be impregnated with resin;
        at least a portion of said vacuum bag being formed from a self-supporting sheet material having a texture formed by upraised portions on a first side of said sheet material, said upraised portions being closely spaced valleys defined between the upraised portions, said valleys forming a resin distribution network said self-supporting sheet material having a predetermined shape, said sheet material rigid enough to retain the predetermined shape as a mold but flexible enough to collapse as a sheet against the part under a vacuum applied during the vacuum assisted resin transfer molding; and
        a main feeder channel having a cross-sectional area larger than a cross-sectional area of said valleys being provided in fluid communication with said valleys and extending along a portion of said tool to provide resin to said resin distribution network;
    providing the part to be molded in said mold cavity;
    sealing said mold cavity;
    connecting a source of uncured resin to said main feeder channel;
    connecting said mold cavity to a vacuum outlet;
    moving said uncured resin through said main feeder channel and said resin distribution network to said vacuum outlet to fill said part in said mold cavity to impregnate said part;
    curing said uncured resin to form a composite structure, and
    wherein, in said tool providing step, said sheet of material forming said portion of said vacuum bag comprises a sheet of thin gauge steel.

7. The method of claim 1, wherein, in said tool providing step, said sheet of material forming said portion of said vacuum bag has a thickness of 0.25 inch or less.

8. The method of claim 1, wherein in said tool providing step, said tool further comprises a vacuum outlet channel formed in said vacuum bag around a perimeter of said tool.

9. The method of claim 1, wherein said step of connecting said source of uncured resin to said feeder channel comprises forming a hole in said vacuum bag and inserting a supply tube from said source into said feeder channel.

10. The method of claim 1, wherein, in said tool providing step, said sheet material comprises a metal material, a plastic material, or a composite material comprising a metal and plastic laminate.

11. The method of claim 1, wherein, in said tool providing step, said sheet material further comprises depressions corresponding to said upraised portions on a second side of said sheet material.

* * * * *